United States Patent

[11] 3,610,641

[72] Inventor Francis E. Ryder
 Lake Zurich, Ill.
[21] Appl. No. 820,814
[22] Filed May 1, 1969
[45] Patented Oct. 1, 1971
[73] Assignee Illinois Tool Works Inc.
 Chicago, Ill.

[54] KEYLESS CHUCK ASSEMBLY
 7 Claims, 5 Drawing Figs.
[52] U.S. Cl. .................................................. 279/1 Q,
 279/56, 279/69, 279/122
[51] Int. Cl. ....................................................... B23b 31/16
[50] Field of Search .......................................... 279/56, 66,
 102, 103, 122, 69, 74, 70, 60, 64, 65, 1 R

[56] References Cited
 UNITED STATES PATENTS
 93,108 1869 Miller ............................ 279/64
 310,060 1884 Johnson ......................... 279/69
 1,415,119 5/1922 Robinson ....................... 279/56
 2,695,177 11/1954 Cawi ............................. 279/66

Primary Examiner—William S. Lawson
Assistant Examiner—James F. Coan
Attorneys—Robert W. Beart, Michael Kovac, Barry L. Clark and Jack R. Halvorsen ABSTRACT: An insulated keyless chuck for drills and the like having threadedly interconnected plastic spindle and collet members providing therebetween an internal chamber for a circumferential array of waferlike chucking elements each with inwardly open hook formations at the outer ends thereof for permissive sliding interengagement with corresponding slots at the outer edges of a pair of cone-shaped retainers one of which is carried by the collet member and the other by the spindle member such that relative axial movement of the collet and spindle members toward or away from each other will effect a radial component of relative movement of the chucking elements toward or away from one another.

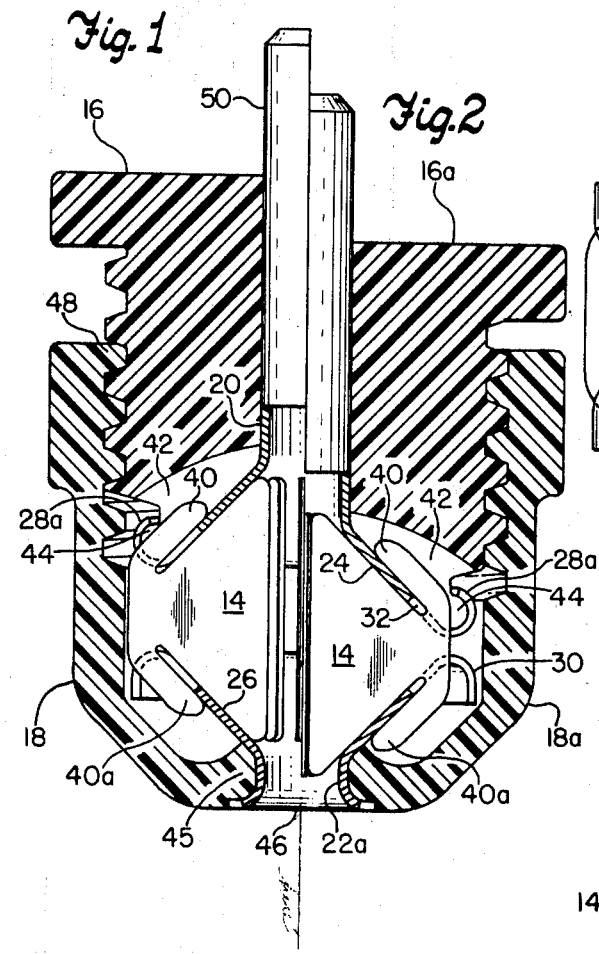
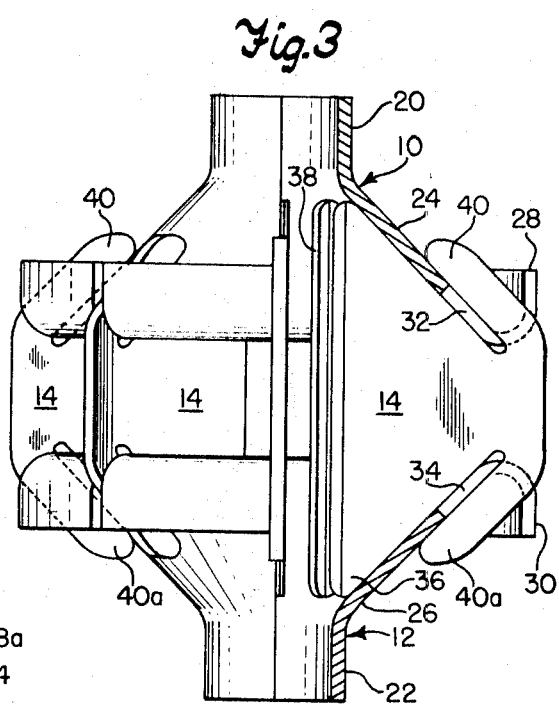
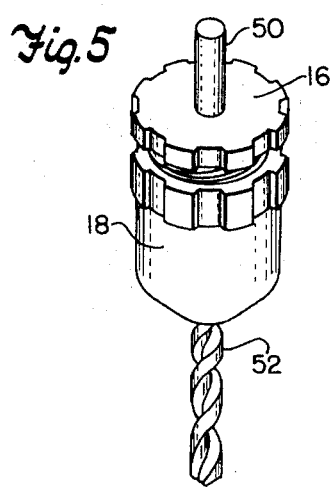
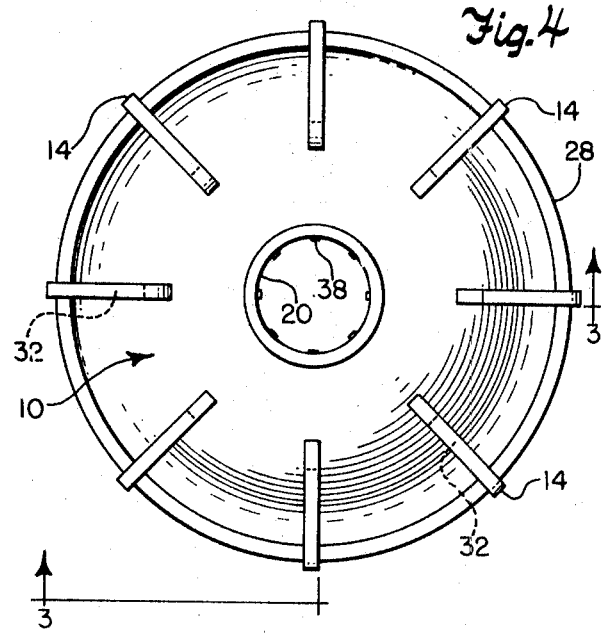

KEYLESS CHUCK ASSEMBLY

The invention is concerned with a drill chuck having threadedly interengaged spindle and collet members of a suitable insulating material such as nylon or the like. The spindle member carries an outwardly flared conelike retainer facing outwardly toward the open end of the collet member which carries a similar conelike retainer flared outwardly in opposition to the other retainer. The outer edges of each retainer are provided with opposed pairs of slots to be associated with upper and lower hooked end formations on an array of flat plate or waferlike chucking elements. Each chucking element is of truncated triangular form with the upper and lower hook formations interfitted in corresponding slots in the opposed retainer members and with the inner elongate edges of the chucking elements disposed along the central longitudinal axis of the chuck assembly. The hook formations engaged with the slots of the retainer carried by the spindle member are guided in recesses formed in the adjacent end of the spindle member. Relative axial movement between the spindle and collet members effects relative inward and outward radial movement of the chucking elements.

An object of the invention is to provide a drill chuck assembly of the keyless type which is completely insulated and which is particularly useful where the workpiece is to be operated upon with extreme accuracy in that the parts thereof may be manufactured with a high degree of accuracy for that purpose.

Another object of the invention is to provide a chuck assembly of the above type wherein different diameter tools may be gripped by the chucking elements as the result of accurately controlled simple straight line relative movement between the interengaged chucking elements and the retainers therefor.

The invention still further provides a drill chuck assembly of the above type wherein the component gripping and retainer parts may be inexpensively mass-produced at high speed and with extreme accuracy of the parts which gripping parts are identical and which retainer parts are initially identical.

In the accompanying drawing:

FIG. 1 is a vertical half section showing the position of the parts with the chucking elements toward open position;

FIG. 2 is an adjacent section similar to FIG. 1 showing the position of the chucking elements in closed position; FIG. 3 is a side elevation, partly in section along the line 3—3 of FIG. 4, showing the chucking elements and retainers therefor before association with the spindle and collet members;

FIG. 4 is a plan view of FIG. 3; and

FIG. 5 is a perspective view showing the chuck assembly in association with a drill.

Referring to the accompanying drawing and particularly to FIGS. 3 and 4, the inner and outer retainer members 10,12 are shown assembled with the chucking elements 14 prior to assembly with a spindle member 16 and a collet member 18 (see FIG. 1). Each retainer member 10,12 is initially identical, as shown in FIG. 3, and includes a central sleeve portion 20,22 respectively, merging with a conical section 24,26, respectively, which are in reversed or opposed assembled position with the conical sections facing each other. The outer edges of the conical sections 24,26, are turned partially upon themselves, as at 28,30, respectively, to provide flange portions which are provided with a plurality of circumferentially opposed pairs of slots 32,34, respectively, which, in turn, extend inwardly along the adjacent conical sections to a limited extent.

Each of the flat or waferlike chucking elements is identical and of generally truncated triangular form with an inner body portion 36 presenting an inner elongated tool clamping tapered edge 38 along the center axis of the assembly. The outer edge of each chucking element is provided with inner and outer fingers 40,40a extending along the adjacent edge of the body portions 36 in spaced relation thereto to provide hook formations interfitted with corresponding slots 32,34, respectively, and snugly receiving adjacent surfaces of the conical sections 24,26, respectively, for relative sliding movement therebetween. Thus, with a chucking element associated with each slot in the retainers 10,12, these chucking elements will also be disposed in a circumferential array of opposed pairs for gripping a drill or similar tool therebetween.

The assembly of retainers 10,12 and associated chucking elements 14 is then assembled with the spindle member 16 and collet member 18 as shown in FIG. 1 to which reference is now made. The sleeve 20 is inserted within the central bore of the spindle member 16 which is provided with downwardly or outwardly opening guiding recesses or slots 42 circumferentially around the inner end thereof and symmetrically spaced with respect to the slots 32 in the conical section 24 of the retainer 10. Thus, when the assembly of FIG. 3 is assembled to the spindle members 16, the fingers 40 of the chucking elements will be received in corresponding spindle recesses 42 which serve to maintain and accurately guide the chucking elements during sliding movement thereof relative to the retainer members as will be pointed out hereinafter. A mounting bead 44 extends around the inner end of the spindle between the outer open ends of the recesses 42 therein and the flange portion 28 of the retainer 10 is spun over this bead 44, as at 28a, to mount the retainer 10 to the spindle member. When so mounted, the sleeve 22 of the retainer 12 is formed, as at 22a, to engage an internal beadlike formation 45 around the central tool receiving opening 46 at the end of the collet member 18, thus to mount the retainer 12 thereto. As understood, the spindle member 16 and collet member 18 are provided with mutually interengaging threads 48 by which the spindle and collet members may be relatively moved axially with respect to one another although the spindle member is relatively fixed to the mounting shaft 50 by which rotation is imparted to the chuck assembly for rotating a tool such as the drill 52, shown in FIG. 5.

In operation, the threaded engagement 48 between the collet and spindle members permits adjustment therebetween along the longitudinal axis of the assembly by rotation of the collet member 18 relative to the spindle member 16 between, for example, the relative positions thereof in FIG. 1 to the positions 16a, 18a thereof in FIG. 2. In the position of FIG. 1, the retainers 10,12 separated to an approximate maximum degree and in reaching this position, the sliding hooked engagement of the chucking elements 14 therewith results in these chucking elements assuming the outward position of FIG. 1. When the spindle and collet members take the position of FIG. 2, the retainers 10,12 are moved toward one another within the chamber between ends of the collet and spindle members and in doing so, the chucking elements 14 will assume the positions of FIG. 2, or any intermediate position depending on the extent of relative axial adjustment of the spindle and collet members. Thus, the assembly is adapted to receive tools of varying shank diameters.

As pointed out, the identical chucking elements can be very accurately produced to close tolerances and positioned around the also accurately produced retainers in opposed pairs so that an inserted tool shank of given diameter is accurately centered and clamped by the chucking elements to substantially eliminate eccentricity in mounting the tool and any wobbling during operation thereof. Movement of the retainer members 10,12 with the spindle and collet members, respectively, causes substantially radial movement of the chucking elements relative thereto with the opposite side edges of the body portions 36 thereof in intimate sliding contact with adjacent inner surfaces of the retainers 10,12 and with the inner edges of the hooks 40,40a in similar sliding engagement with the outer surfaces of the retainer members 10,12 respectively. During such movement, the chucking elements are guided and controlled by movement of the outer portions of the hooks 40 in the guiding recess 42 of the spindle member. The spindle and collet members are of a suitable insulating material, such as nylon, other plastics, or other suitable insulating materials. The shaft 50 may be of cold-roll steel; the chucking elements 14 of SAE–1065 steel, or equivalent, hardened and tempered; and the retainer members 10,12 of SAE–1010 cold-roll steel, or equivalent, dee draw, case hardened.

I claim:

1. A keyless chuck assembly comprising spindle and collet members threadedly interconnected for relative axial adjustment therebetween and providing an internal chamber, a circumferential array of relatively thin and flat waferlike chucking elements arranged in opposed pairs of said chamber with the inner edges thereof generally parallel to the longitudinal center axis of the chuck assembly to receive therebetween a tool shank inserted through the collet member opening, and a pair of retainer members within said chamber with one member carried by said spindle member and the other carried by said collet member, said retainer members slidably connecting opposed outer edge portions of said chucking elements to said spindle and collet members, each of said retainer members including a substantially identical conical body portion with the concave side thereof facing the outer retainer member with the outwardly disposed peripheral edges of said conical body portions being slidably interconnected at opposite ends of the outer edge portions of said chucking elements, respectively, for radial movement thereof toward or away from the longitudinal center axis of the chuck assembly in accordance with relative axial adjustment of said spindle and collet members toward or away from each other permitting the gripping of tool shanks or various diameters between the inner edges of said chucking elements wherein the outwardly disposed peripheral edges of said body portions are provided with radial slots circumferentially spaced in accordance with the spacing of said chucking elements each of which has the outer edge portion disposed in a corresponding slot for the slidable interconnection between the chucking elements and the retainer members.

2. A keyless chuck assembly as claimed in claim 1, wherein the outer edge portions of said chucking elements are provided with pairs of hook members in sliding contact with corresponding adjacent outer surfaces of said body portions inwardly of the closed ends of the slots therein.

3. A keyless chuck assembly as claimed in claim 2, wherein the opposed radial edges of the body portions of said chucking elements are in sliding contact with adjacent inner surfaces of the body portions of said chucking elements.

4. A keyless chuck assembly as claimed in claim 3, wherein the inner end of the spindle member is slotted in accordance with the slots in said retainer members with adjacent hook members of the chucking elements slidable in and guided by a corresponding spindle member slot.

5. A keyless chuck assembly as claimed in claim 4, wherein the spindle member is provided with enlargements between the outer ends of the slots therein and the outer edge of the body portion of the retainer member between the slots therein is turned into engagement with said enlargements to mount the same to said spindle member.

6. A keyless chuck assembly as claimed in claim 5, wherein the other retainer member includes a reduced neck portion shaped to engage the collet member around the tool-receiving opening to mount the said other retainer member to said collet member.

7. An insulated keyless chuck assembly as claimed in claim 1, wherein said opposed conical retainer members are provided for slidable connection of the outer edges thereof with hook formations at the outer edge portions of said chucking elements with the retainer members and chucking elements formed of steel and with the spindle and collet members formed of a plastic insulating material.